US011485094B2

(12) United States Patent
Moreels

(10) Patent No.: US 11,485,094 B2
(45) Date of Patent: Nov. 1, 2022

(54) PROCESS FOR THE PRODUCTION OF AN ARTICLE FOR THE CLADDING OF FLOORS OR WALLS

(71) Applicant: POLYSTO, Lokeren (BE)

(72) Inventor: Alexandre Moreels, Mortsel (BE)

(73) Assignee: POLYSTO, Lokeren (BE)

(*) Notice: Subject to any disclaimer, the term of this patent is extended or adjusted under 35 U.S.C. 154(b) by 294 days.

(21) Appl. No.: 16/415,883

(22) Filed: May 17, 2019

(65) Prior Publication Data

US 2019/0351595 A1 Nov. 21, 2019

Related U.S. Application Data

(60) Provisional application No. 62/673,712, filed on May 18, 2018.

(51) Int. Cl.

| | |
|---|---|
| *B29C 67/24* | (2006.01) |
| *C04B 14/06* | (2006.01) |
| *B29C 33/58* | (2006.01) |
| *B29C 37/00* | (2006.01) |
| *C04B 14/28* | (2006.01) |
| *B29C 45/16* | (2006.01) |
| *B29K 67/00* | (2006.01) |
| *B29K 509/02* | (2006.01) |
| *B29L 31/10* | (2006.01) |
| *B29K 105/06* | (2006.01) |
| *B29C 70/02* | (2006.01) |
| *B29C 70/58* | (2006.01) |
| *B29C 39/00* | (2006.01) |

(52) U.S. Cl.
CPC ............ *B29C 67/242* (2013.01); *B29C 33/58* (2013.01); *B29C 37/0025* (2013.01); *B29C 37/0032* (2013.01); *B29C 67/243* (2013.01); *C04B 14/06* (2013.01); *C04B 14/28* (2013.01); *C04B 14/285* (2013.01); *B29C 39/003* (2013.01); *B29C 45/1679* (2013.01); *B29C 67/244* (2013.01); *B29C 70/021* (2013.01); *B29C 70/58* (2013.01); *B29C 2037/0035* (2013.01); *B29K 2067/00* (2013.01); *B29K 2067/06* (2013.01); *B29K 2105/06* (2013.01); *B29K 2509/02* (2013.01); *B29L 2031/10* (2013.01)

(58) Field of Classification Search
CPC ..... B29C 70/021; B29C 70/58; B29C 67/242; B29C 67/243; B29C 67/244; C04B 14/06; C04B 14/28; C04B 14/285
See application file for complete search history.

(56) References Cited

U.S. PATENT DOCUMENTS

| | | | |
|---|---|---|---|
| 3,078,249 A | 2/1963 | Russell | |
| 4,212,790 A * | 7/1980 | Ibata | C04B 26/18 523/521 |
| 4,235,948 A * | 11/1980 | Holmes | B44F 9/04 428/431 |
| 4,346,050 A | 8/1982 | Trent et al. | |
| 4,446,177 A * | 5/1984 | Munoz | B44F 9/04 428/36.1 |
| 5,604,266 A * | 2/1997 | Mushovic | C08J 9/32 521/137 |
| 6,056,904 A * | 5/2000 | Wiener | B29C 39/003 524/437 |
| 6,153,670 A * | 11/2000 | Skelhorn | B29C 44/3446 523/210 |
| 6,323,269 B1 * | 11/2001 | Skelhorn | B29C 44/3446 524/425 |
| 6,387,504 B1 * | 5/2002 | Mushovic | B32B 13/00 525/437 |
| 6,699,544 B2 * | 3/2004 | Schoela | B29C 70/58 428/35.7 |
| 7,431,789 B2 * | 10/2008 | Mack | C09D 4/00 156/245 |

(Continued)

FOREIGN PATENT DOCUMENTS

| | | |
|---|---|---|
| BE | 1017613 A6 | 2/2009 |
| DE | 2619058 A1 | 11/1977 |

(Continued)

OTHER PUBLICATIONS

Marbocote, Technical Data Sheet: Spraycote FD: Mould Release Agent, http://www.marboamerica.com/Tech%20Data/TDS_Spraycote.pdf, Apr. 23, 2003 (Year: 2003).*

Lee, Ming-Yu, et al. "Artificial stone slab production using waste glass, stone fragments and vacuum vibratory compaction." Cement and Concrete Composites 30.7 (Apr. 6, 2008): 583-587. (Year: 2008).*

Peng, Lihua, and Shan Qin. "Mechanical behaviour and microstructure of an artificial stone slab prepared using a SiO2 waste crucible and quartz sand." Construction and Building Materials 171 (Mar. 26, 2018): 273-280. (Year: 2018).*

Gomes, Maria Luiza PM, et al. "Production and characterization of a novel artificial stone using brick residue and quarry dust in epoxy matrix." Journal of materials research and technology 7.4 (Nov. 3, 2018): 492-498. (Year: 2018).*

(Continued)

*Primary Examiner* — Benjamin A Schiffman
(74) *Attorney, Agent, or Firm* — Christensen O'Connor Johnson Kindness PLLC

(57) ABSTRACT

A process for the production of an article for the cladding of floors or walls, comprising the steps of, in a mold: a) optionally applying a gel coat layer, based on a first curing polymer resin, on the inside of the mold in order to obtain a coated mold, and b) introducing into the core of the mold or into the core of the coated mold from step a) a filling composition which is based on a second curing polymer resin supplemented with at least one mineral filler, wherein core contains at least 5% wt and at most 20% wt of curing polymer resin, relative to the dry amount of filling composition, and the filling composition contains only one single initiator in a concentration of 0.5% wt to 5.0% wt relative to the amount of curing polymer resin in the filling composition.

27 Claims, No Drawings

(56) References Cited

U.S. PATENT DOCUMENTS

| | | | |
|---|---|---|---|
| 7,713,615 B2* | 5/2010 | Black | E04F 13/141 |
| | | | 428/294.7 |
| 2019/0077060 A1* | 3/2019 | Choi | C08K 7/14 |
| 2019/0300703 A1* | 10/2019 | Ruede | C08K 11/005 |

FOREIGN PATENT DOCUMENTS

| | | |
|---|---|---|
| DE | 3145334 A1 | 5/1983 |
| DE | 4340953 C1 | 4/1995 |
| EP | 0848120 A1 | 6/1998 |
| NL | 1006957 C1 | 3/1999 |
| WO | 2014/114989 A1 | 7/2014 |

OTHER PUBLICATIONS

International Search Report and Written Opinion dated Jul. 19, 2019, issued in corresponding International Application No. PCT/EP2019/062782, filed May 17, 2019, 11 pages.
European Search Report dated Nov. 6, 2018, issued in corresponding European Application No. 18173102.7, filed May 18, 2018, 7 pages.

* cited by examiner

PROCESS FOR THE PRODUCTION OF AN ARTICLE FOR THE CLADDING OF FLOORS OR WALLS

CROSS-REFERENCE TO RELATED APPLICATION

This application claims the benefit of U.S. Provisional Application No. 62/673,712, filed May 17, 2018, the disclosure of which is incorporated by reference herein.

FIELD OF THE DISCLOSURE

Embodiments of the present disclosure relate to an improved method for the production of elements intended for the cladding of surfaces in the building industry. More particularly, the disclosure relates to the production of protection elements, such as plinths and bumpers/fenders which are suitable for use in hygienically sensitive areas, such as in the food industry, in the pharmaceutical industry, in hospitals, or in clean rooms, such as, for example, also in the electronics industry.

BACKGROUND

It is known to apply protection elements such as plinths and bumpers/fenders in the places where walls and floors merge into one another. These elements may mechanically protect the bottom part of the walls, and indirectly the walls above them, against knocks and bumps by trolleys, carts, forklifts, pallet trucks, pump trucks or pallet trucks, also known as trans pallet trucks, or also by mobile equipment or furniture, such as serving trolleys or hospital beds. Especially the corners of passages are very vulnerable, and in those locations such protection is therefore very important.

The more traditional plinths, usually made of wood, plastic or light metal, cannot be used in many environments because they are not providing sufficient sturdiness and/or wear resistance, easily deform, do not comply with the hygiene requirements associated with the function of the building in which they are used, or do not show the appropriate aesthetic look.

Firmer shock plinths may be made of concrete, but this material is relatively brittle and crumbles easily, usually has a certain porosity and is not water repellent, whereby these shock plinths are also from a hygienic point of view undesirable.

For this reason, such concrete bumpers/fenders are often provided with a metal coating on the outside, at least partially, but preferably over the entire visible surface. Stainless steel is often used in this context, because it confers a more hygienic and aesthetic view and also maintains this for a long time period. To improve the adhesion of the steel outer layer to the concrete, the metal coating may for a better anchoring be shaped so that it grips around the concrete core and/or an edge thereof may be incorporated into the concrete core. German Patent Specification DE 4340953 C1 describes such an embodiment, wherein a filling part consisting of polystyrene foam is used to decrease the weight of the product. To improve the adhesion of the steel outer layer to the concrete, the metal layer may also be glued. Such plinths are amongst others described in Belgian Patent Specification BE 1017613 A6. This additional metal coating is, however, cumbersome to apply.

DE 2619058 A1 describes a similar embodiment with a core of polyurethane (PU) foam. This foam may be given an appropriate firmness and elasticity to support the outer metal layer, to protect it against deformation upon impact, and even to provide it with a certain cushioning and flexibility.

This additional metal coating represents in all described applications a significant additional cost in terms of materials and requires additional steps in the manufacturing process.

In addition, the lap joints of the plinths, i.e. the sides where two consecutive plinths approach each other, still remain in most of these models uncovered, so that they are still pretty roughly and imprecisely finished. When installing the bumpers/fenders, this leads to wider joints, which is undesirable because dirt more readily settles in those locations and because they require more material for being filled.

Plinths on the basis of less brittle materials than concrete have also been developed. The core of such plinths may use plastics as a binding agent, preferably supplemented with one or more filling materials. The binding agents are preferably polymeric resins which cure by cross-linking, so that they form a solid three-dimensional molecular structure. In this way they offer a good adhesion to the filling materials, and a solid structure. Preferably, these resins are also water-repellent, so that the plinths may also comply with some of the hygienic requirements.

EP 848120 A1 discloses a solid plinth formed from a composite material consisting of silicon particles coated with a polyester binder, to which a dye may be added. A disadvantage of this embodiment is that a smooth outer surface is difficult to achieve because of the particles in the mass. If a high gloss, good colouring, and/or other additional properties are to be given to the plinths by additives, then high amounts of these additives are necessary to achieve the desired result in this embodiment. The properties of the core and of the surface may also not be influenced independently of each other.

At the outer sides which are intended for remaining visible, these plinths, therefore, may be further provided with an upper layer. This layer may also consist of plastic, because of good chemical and water repellent properties, and which may be given a certain decorative effect by way of a pigment. In order to increase the wear resistance of the plinths, a very strong cross-linking polymeric resin is preferably also used for the top layer, so that ultimately a surface with high hardness is obtained.

NL 1006957 describes a bumper/fender which is produced by first laying a prefabricated fibre-reinforced synthetic resin profile in a pre-formed mold, or by making therein a top layer of a fibre reinforced coating. This top layer is made of a food-safe coating consisting of polyester resin mixed and filled up with fibres and/or glass fleece, produced to meet a particular impact strength. After the production of the top layer, the mold is filled with a composition consisting of very fine gravel parts, or other filling materials, and a polyester resin or other synthetic resin. Also accessories such as inside and outside corners and end pieces are described. NL 1006957 is not concerned with the compatibility between the binders of the top layer and of the core, nor with the adhesion between the core and the top layer of the bumper/fender.

DE 3145334 A1 describes a stairs step which is produced by applying on a glass plate a thin layer of a mixture on the basis of a resin "Feinschichtharz Nr. 325", which at 20° C. ambient temperature has a gelation time of eight to twelve minutes, within which time the layer must have been applied. About 20 minutes, at the latest two hours, after the application of the thin layer on the glass, into the mold is poured the material for the filling layer, which is based on a polyester resin, and which is subsequently allowed to polymerize. The filling layer comprises 5 kg of polyester resin plus 1 liter (0.909 kg) of styrene as the curing resin components, together with 9 liter (9.9 kg) of quartz powder and 1 liter (1.3 kg) of quartz sand. This filling layer is thus comprising 33.83% wt or curing polymer relative to the dry amount of filling composition. The inventor has also found that the adhesion between the core and the top layer of DE 3145334 A1 may be further improved.

U.S. Pat. No. 4,346,050 discloses a polymer bonded concrete having low binder levels, which is proposed as the construction material for precast panels for fascia panels for buildings and for wall cladding. The concrete object may be given a plastic-like finish by applying a coating of pigmented resin in the mold prior to casting of the concrete. The polymer concrete comprises at most 3.5% wt of polyester resin plus styrene. Half or more of the polymer concrete in U.S. Pat. No. 4,346,050 consisted of round quartz aggregates in the range of at least ⅛" (3.18 mm) up to ½" (12.7 mm) or even up to 1" (25.4 mm). The average particle sizes of the round quartz aggregates used were thus 8 mm or higher. The inventor has reworked the product disclosed in U.S. Pat. No. 4,346,050 and found that the low curing resin content makes the composition very difficult to process, has insufficiently low shrinkage such that the product is difficult to demold, and leads to a product that is too brittle for the shock plinth main application of the present disclosure. In addition, the surfaces of the obtained product have an unacceptably high roughness. They do not meet the tight dimensional tolerances required for a low seam connection between adjacent plinths and a low seam adherence to the wall. Neither do the products meet the quality and aesthetic requirements imposed by the food industry.

It is also not obvious how such plinths having both a core and a top layer on the basis of synthetic material may be produced in a simple way. It is important in this respect that the top layer is attached as tight as possible to the material of the core. And from an aesthetic point of view, it is also desirable to obtain very smooth outer surfaces. In addition, the upper layer with its high hardness also raises a problem of high brittleness, so that at the moment of mounting, wherein at times a pry bar must be used due to the weight of the element to be installed, there is a risk that flakes of the upper layer desquamate whereby the aesthetic effect is lost. The brittleness of both the upper layer and the core raises furthermore an additional problem that at unequal shrinkage of coating and core cracking may arise, making the product as such no longer useful and often must be disposed of as waste.

Thus, there remains a need for a simple process for the production of such cladding elements, wherein the top layer has a good adhesion with the core of the element, as well as to plinths or other cladding elements of which the plastic top layer and/or the core is less brittle than what so far is known in the art.

WO 2014/1149889 A1 discloses a method for the production of a plinth wherein a stainless steel mold is first polished with a release agent which is additionally polished. Into the polished mold is then applied a gel coat layer containing a polyester gel coat and an initiator, and the coated mold is stored during 20 minutes at 20° C. to partially cure the gel coat layer, after which the mold is filled with a filling composition containing a solid mixture of quartz grains, silica sand and dolomite powder mixed in a 79/21 weight ratio with an unsaturated polyester resin binder further comprising 2% of Andonox KP-LE from Syrgis Performance Initiators AB (SE) as hardener plus 2% of Accelerator NL-49P from Akzo Nobel Polymer Chemicals BV (NL). The Andonox KP-LE hardener or catalyst comprises a mixture of two curing agents, i.e. methyl ethyl ketone peroxide as the faster and cumyl hydroperoxide as the slower, in dimethyl phthalate as carrier. The core was filled, vibrated and allowed to further react and cure by storage during about 2 hours, before the plinth product could be removed from the mold.

There remains a problem of reducing the curing time of the final product. Other problems that may be addressed are the high quantity of resin that is used in the art to make the filling composition for the core, the reuse of the molds, the adhesion of gelcoat layer and core, and the risk for deformation during the curing of the final product.

SUMMARY

The present disclosure aims to obviate or at least mitigate the above described problem or to provide improvements generally.

According to the disclosure, there is provided a process as defined in any of the accompanying claims.

In an embodiment, the disclosure provides a process for the production of an article for the cladding of floors or walls, comprising the steps of, in a mold:

a) optionally applying a gel coat layer, based on a first curing polymer resin, on the inside of the mold in order to obtain a coated mold, b) introducing into the core of the mold or into the core of the coated mold from step a) a filling composition which is based on a second curing polymer resin supplemented with at least one mineral filler, wherein the core of the article has a thickness of at least 10 mm, the filling composition for the core contains at least 5% wt and at most 20% wt of curing polymer resin, relative to the dry amount of filling composition, and the filling composition contains only one single initiator in a concentration of 0.5% wt to 5.0% wt, relative to the amount of curing polymer resin in the filling composition.

The inventor has found, for thick objects made of unsaturated polyester concrete and contrary to what the prior art relating to initiators for unsaturated polyester resins teaches, that it is advantageous to use only one single initiator in combination with a reduced amount of reactive resin.

In the art of unsaturated polyester resins, it has up to now been taught that for objects of significant thickness, a combination of two initiators or hardeners should be used, i.e. one fast initiator and one slower initiator, to limit the exotherm of the curing reaction. This advice is particularly inspired by the risk for decoloration of the product. We have however found that the slow curing allows for stratification of the composition before the curing reaction has sufficiently proceeded, and also requires the curing product to stay long in the mold. The stratification of the composition, whereby more dense ingredients such as parts of the filler may settle under gravity, may lead to deformation of the product when it is released from the mold, which products are useless and have to be discarded.

The inventor has found, by combining into a thick object a lower amount of curing polymer and a single initiator in the filling composition, that the curing may be made to happen much faster while the temperature during the curing stays within its allowable limits. The inventor has found that the peak temperature under these circumstances still remains acceptably low, but that the curing time may be reduced significantly. In addition, the risk for product deformation is significantly reduced.

The inventor has also found that the present disclosure also brings the advantage that the temperature at the start of the curing of the core rises faster and that the peak temperature in the core is also higher. The inventor has found that the higher peak temperature during the curing of the core brings no problem of discolouration. The sharper and higher temperature profile during curing of the core brings the advantage, if styrene is present in the filling composition, that the concentration of styrene monomer remaining in the final product is reduced. This styrene monomer may release from the product, in particular when the product has to be cut or sawn to adjust its size to the allowed space. The present disclosure therefore brings an advantage in terms of industrial hygiene for the people installing the product. The reduced possible release of styrene is also very important in the food industry, because some foodstuffs have a tendency to absorb styrene, and may quickly become inedible because of an excessive styrene content.

The inventor has further found that the reduced presence of reactive polymer in the filling composition improves the fire performances of the final product, and that this improvement is noticeable in the results of fire tests according to international standards.

The inventor has found that the filling composition should also comply with the prescribed lower limit for curing polymer content. The inventor has found that this condition is important for obtaining a number of technical advantages. The higher curing polymer content makes the filling composition easier to mix up to obtain a more homogeneous mixture, to avoid warping of the final product, and easier to process the composition through the equipment. Another benefit is that the composition in the mold is easier to finish, and enables the achievement of a tight dimensional tolerance, which makes the products suitable for low seam adhesive joint for adhering the back of the object to another surface, and for low seam joints between adjacent objects adhered to the same surface. Also the surface finish requirements of the food industry may thereby more readily be met. Yet another advantage is that the higher curing polymer content also brings a more important shrinkage during the hardening, such that the finished product is easy to demold.

The inventor has found that the article as produced by the process according to the present disclosure comprising step a) is highly suitable in so-called "High Care" applications, such as in the more sensitive areas of buildings in which on an industrial scale pharmaceuticals are produced, or in the food industry where foodstuffs are prepared and packaged. The inventor has found that the article as produced by the process according to the present disclosure not comprising step a) is highly acceptable in so-called "Low Care" applications, where the requirements in terms of industrial hygiene are less stringent.

DETAILED DESCRIPTION

The present disclosure will hereinafter be described in particular embodiments, and with possible reference to particular drawings, but the disclosure is not limited thereto, but only by the claims. Any drawings described are only schematic and are non-limiting. In the drawings, the size of some of the elements may be exaggerated and not drawn to scale for illustrative purposes. The dimensions and the relative dimensions in the drawings do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than those described and/or illustrated herein.

Moreover, the terms top, bottom, over, under and the like in the description and the claims are used for descriptive purposes and not necessarily for describing relative positions. The terms so used are interchangeable under appropriate circumstances and the embodiments of the disclosure described herein may operate in other orientations than described or illustrated herein.

The term "comprising", as used in the claims, should not be considered as being limited to the elements that are listed in context with it. It does not exclude that there are other elements or steps. It should be considered as the presence provided of these features, integers, steps or components as required, but does not preclude the presence or addition of one or more other features, integers, steps or components, or groups thereof. Thus, the volume of "an article comprising means A and B" may not be limited to an object which is composed solely of agents A and B. It means that A and B are the only elements of interest to the subject matter in connection with the present disclosure. In accordance with this, the terms "comprise" or "embed" enclose also the more restrictive terms "consisting essentially of" and "consist of". By replacing "comprise" or "include" with "consist of" these terms therefore represent the basis of preferred but narrowed embodiments, which are also provided as part of the content of this document with regard to the present disclosure. For the purposes of the present disclosure, the phrase "at least one of A, B, and C," for example, means (A), (B), (C), (A and B), (A and C), (B and C), or (A, B, and C), including all further possible permutations when greater than three elements are listed.

Unless specified otherwise, all values provided herein include up to and including the endpoints given, and the values of the constituents or components of the compositions are expressed in weight percent or % by weight of each ingredient in the composition. The terms "about," "approximately," "near," etc., mean plus or minus 5% of the stated value.

As used herein, "weight percent," "wt-%," "percent by weight," "% by weight,", "ppmwt", "ppm by weight", "weight ppm" or "ppm" and variations thereof refer to the concentration of a substance as the weight of that substance divided by the total weight of the composition and multiplied by 100, unless specified differently. It is understood that, as used here, "percent," "%," are intended to be synonymous with "weight percent," "wt-%," etc.

It should be noted that, as used in this specification and the appended claims, the singular forms "a," "an," and "the" include plural referents unless the content clearly dictates otherwise. Thus, for example, reference to a composition containing "a compound" includes a composition having two or more compounds. It should also be noted that the term "or" is generally employed in its sense including "and/or" unless the content clearly dictates otherwise.

Additionally, each compound used herein may be discussed interchangeably with respect to its chemical formula, chemical name, abbreviation, etc.

It should be understand that while the terms "prefers," "preferably", "more preferably," etc., have been used throughout the disclosure, these terms are not intended to limit the present disclosure but only to provide a number of examples or embodiments.

In an embodiment of the present disclosure, the filling composition contains the one single initiator or hardener or catalyst in a concentration of at least 1.0% wt relative to the amount of curing polymer resin in the filling composition, preferably at least 1.25% wt,. The inventor has found that this contributes to the desired curing rate and to the final product properties. Optionally the filling composition contains at most 4.50% wt of the initiator, preferably at most 4.0% wt, more preferably at most 3.5% wt, even more preferably at most 3.0% wt, preferably at most 2.5% wt, more preferably at most 2.0% wt, even more preferably at most 1.5% wt. The inventor has found that there is no need to exceed the upper limit as specified, because extra initiator does not bring sufficient benefits in order to justify the higher level.

In an embodiment of the present disclosure, the core of the article has a thickness of at least 15 mm, preferably at least 20 mm, more preferably at least 25 mm, even more preferably at least 30 mm. The inventor has found that the advantages of the present disclosure become even more pronounced when the core of the article has a higher thickness. Optionally the core of the article has a thickness of at most 200 mm, preferably at most 175 mm, more preferably at most 150 mm, even more preferably at most 125 mm, preferably at most 100 mm, more preferably at most 80 mm, even more preferably at most 60 mm. The inventor has found that it is advantageous to limit the thickness of the core as specified, because extra thickness does not bring much additional mechanical properties but adds to the weight and the material use of the article, which increases the costs of production and of the handling of the article.

In an embodiment of the present disclosure, the core is fibre-reinforced. The inventor prefers in particular to reinforce thinner products with a fibre layer. The inventor prefers to use glass fibre for the reinforcement. The inventor prefers to introduce the fibre reinforcement, on top of the core after the filling composition is introduced and equalized.

In an embodiment of the present disclosure, the filling composition for the core contains at most 19% wt of curing polymer resin, preferably at most 18% wt, more preferably at most 17% wt, even more preferably at most 16% wt, preferably at most 15% wt, more preferably at most 14% wt, even more preferably at most 13% wt, preferably at most 12% wt, more preferably at most 11% wt, even more preferably at most 10% wt of the second curing resin. The inventor has found that the lower the concentration of curing polymer resin in the filling composition, the sharper the temperature profile during curing may be, and hence the more active the hardener may be selected.

Optionally the filling composition contains at least 5.0% wt of the second curing resin, preferably at least 6% wt, more preferably at least 7% wt, even more preferably at least 8% wt, preferably at least 9% wt, more preferably at least 10% wt, even more preferably at least 11% wt of the second curing resin. The inventor has found that the higher the concentration of the second curing resin in the filling composition, the better the mechanical properties of the core are.

In principle, a wide variety of thermosets or thermosetting polymers or polymer resins may be used within the framework of the present disclosure. Alkyd resins, phenol formaldehyde (PF) resins, diallyl phthalate (DAP) resins, melamine-formaldehyde (MF) resins, polyester resins, and urea-formaldehyde (UF) resins are possible.

The inventor however prefers to use unsaturated polyesters, because these resins take up virtually no moisture, may even be water repellent, are good cold and heat resistant, are well resisting to acids, oxidizing agents and dilute alkalis, are good resisting to sunlight, are very wear resistant, are highly pressure-resistant, may give a high gloss, and are not affected by bacteria and fungi. Moreover, they are easy to handle, the curing reaction is easy to start and the reaction rate is easy to steer, and this within a wide temperature range which is easy to reach and typically includes the normal ambient temperature and/or room temperature. The inventor has also found that the cured polyester based bumpers/fenders have an impact resistance that is twice as high as concrete. An additional advantage is that these polyesters also undergo a slight shrinkage during curing, rendering the demolding of the products much easier.

In an embodiment of the present disclosure, the second curing polymer belongs to the family of unsaturated polyester polymer resins, and wherein preferably for the curing reaction a vinyl monomer has been incorporated, more preferably styrene.

In the filling composition for the core, which is applied in step b), the inventor prefers to use a composition which is also based on unsaturated polyester resin as a binder, together with at least one mineral filler.

Unsaturated polyesters are curing polymer resins. Generally, they are copolymers obtained by the polymerisation of one or more polyols, usually diols, such as monoethylene glycol (MEG), with unsaturated dicarboxylic acids such as maleic acid or fumaric acid, and/or the anhydrides thereof. Hereby also partially saturated and/or aromatic acids and/or their anhydrides may be used, such as the various forms of phthalic acid or phthalic acid anhydride. The double bond of the unsaturated polyesters reacts during curing with a vinyl monomer, usually styrene, so that a three-dimensional cross-linked structure is formed. The cross-linking is usually set in motion by an exothermic reaction in which an organic peroxide may be used as an initiator, often also called less accurately the catalyst, such as methyl ethyl ketone peroxide, benzoyl peroxide or dibenzoyl peroxide. The initiator usually acts by releasing a free radical which initiates the polymerization or chain reaction.

As vinyl monomer usually styrene, α-methyl styrene, para- or meta-styrene, divinyl benzene, diallyl phthalate and prepolymers thereof, diallyl isophthalate, diallyl terephthalate, or prepolymers thereof, N-vinyl pyrrolidone, triallyl cyanurate, diallyl melamine, or the like, alone or in mixtures with each other are being used. Other vinyl monomers which may be used are the alkyl-styrenes, and other allyl, acrylate or methacrylate esters.

Suitable unsaturated polyesters are commercially offered by many companies, and are available in a wide range of properties. Such polyesters are also commercially available in mixtures with styrene so that they may immediately be used as a binder in the step b) of the method according to the present disclosure.

In an embodiment of the present disclosure, the one single initiator in the filling composition is an organic peroxide, more preferably methyl ethyl ketone peroxide (MEKP).

The cross-linking or curing reaction with unsaturated polyester resins is preferably a free radical polymerization reaction. This reaction is preferably initiated by an initiator, also called curing agent, a.k.a. hardener or catalyst. As initiator for the curing reaction, preferably peroxides are used, often a combination of several peroxides, more preferably organic peroxides because they are less volatile, and because they may often be supplied as a liquid. Suitable are, for example, hydrogen peroxide, benzoyl peroxide, lauryl peroxide, dicumyl peroxide, p-tertiary butyl perbenzoate, acetyl acetone peroxide (AAP), methyl isobutyl ketone peroxide, and the like. The inventor prefers to use methyl ethyl ketone peroxide (MEKP). MEKP gives a reliable performance at ambient temperature and at room temperature. The MEKP is normally supplied as a 30-40 wt % solution in a suitable solvent such as, for example, dimethyl phthalate ester. In addition, preferably, a phlegmatiser is added, which is a substance which stabilizes the relatively unstable peroxide during storage and for transport and handling, until it is expected to carry out its action. As a phlegmatiser, for example, 2,2,4-trimethyl-1,3-pentanediol diisobutyrate, also known as TXIB, may be used. Also other organic compounds having little to no of the relatively less stable —$CH_2$— groups may be used. The initiator brings the advantage that the cross-linking or curing reaction may be initiated at ambient and/or room temperature. As a result, extremely high temperatures are avoided, which may otherwise lead to discolouration in thin products are in top layers, and even to a loss of the chemical and mechanical properties of the product.

The inventor prefers to apply the curing agent in a concentration of 1.0-5.0% by weight relative to the total amount of resin, preferably 1.2-4.0% by weight, more preferably 1.4-3.0% by weight, even more preferably 1.5-2.5% by weight, and yet more preferably 1.8-2.2 wt %, typically about 2.0 wt %, and this on the basis of the weight of the total amount of resin, including the other monomers such as the vinyl monomer and/or DCPD, in the composition.

In an embodiment of the present disclosure wherein the process comprises step a), the first and the second curing polymer resins belong to the same chemical family of curable polymeric resins. The inventor has found that this improves the adhesion between the gel coat layer and the core.

In an embodiment of the present disclosure wherein the process comprises step a), the gel coat layer in the coated mold of step a) is only cured partially before the coated mold of step a) is subjected to step b).

In an embodiment of the present disclosure wherein the process comprises step a), the curing polymer resin of step a) is cured only until the gel coat layer is at most touch dry, before the coated mold of step a) is subjected to step b).

The inventor has found that the process according to the present disclosure is extremely simple, and moreover, if the process comprises step a), because the gel coat layer is only cured partially before the filling composition is introduced in step b), preferably only until the gel coat layer is at most touch dry, provides without any layer of glue an exceptionally good adhesion between the gel coat upper layer and the core of the produced product. The inventor has also found that by an appropriate selection of the raw materials, and by addition and appropriate selection of additives, initiators, accelerators and/or retarders, the course of the curing of the resins of step a) and step b) may be set independently from each other, so that they optimally meet the stated requirements and, at the same time may be adjusted to each other to be able to produce a product with the desired properties in a simple and fast way, and this with relatively little human intervention.

In an embodiment of the present disclosure wherein the process comprises step a), the first curing polymer resin belongs to the family of unsaturated polyester polymer resins, and wherein preferably for the curing reaction a vinyl monomer has been incorporated, more preferably styrene.

Unsaturated polyesters are curing polymer resins. Generally, they are copolymers obtained by the polymerisation of one or more polyols, usually diols, such as monoethylene glycol (MEG), with unsaturated dicarboxylic acids such as maleic acid or fumaric acid, and/or the anhydrides thereof. Hereby also partially saturated and/or aromatic acids and/or their anhydrides may be used, such as the various forms of phthalic acid or phthalic acid anhydride. The double bond of the unsaturated polyesters reacts during curing with a vinyl monomer, usually styrene, so that a three-dimensional cross-linked structure is formed. The cross-linking is usually set in motion by an exothermic reaction in which an organic peroxide may be used as an initiator, often also called less accurately the catalyst, such as methyl ethyl ketone peroxide, benzoyl peroxide or dibenzoyl peroxide. The initiator usually acts by releasing a free radical which initiates the polymerization or chain reaction.

As vinyl monomer usually styrene, α-methyl styrene, para- or meta-styrene, divinyl benzene, diallyl phthalate and prepolymers thereof, diallyl isophthalate, diallyl terephthalate, or prepolymers thereof, N-vinyl pyrrolidone, triallyl cyanurate, diallyl melamine, or the like, alone or in mixtures with each other are being used. Other vinyl monomers which may be used are the alkyl-styrenes, and other allyl, acrylate or methacrylate esters.

Suitable unsaturated polyesters are commercially offered by many companies, and are available in a wide range of properties. Such polyesters are also commercially available in mixtures with styrene so that they may immediately be used as a binder in the step b) of the method according to the present disclosure.

The compositions of the process according to the present disclosure are preferably based on a polyester, such as obtained by the esterification of a polyvalent carboxylic acid with a polyol, which means a chemical substance having at least two hydroxyl (OH) groups.

The polyvalent carboxylic acid of the polyester resin may be aliphatic or aromatic. The inventor prefers to use a polyester formed from an aromatic polyvalent carboxylic acid. Suitable candidates are, for example, phthalic acid, also called orthophthalic acid, isophthalic acid and/or terephthalic acid, but also acids with several benzene nuclei are possible. The inventor prefers a gel coat which is based on orthophthalic acid, most preferably based primarily on orthophthalic acid.

There are many polyols which may be used in the polyester according to the present disclosure. Suitable are, for example, ethylene glycol, 1,2-propylene glycol, 1,3-propylene glycol, 1,3-butanediol, 1,4-butanediol, diethylene glycol, dipropylene glycol, neopentyl glycol, and bis-((3-hydroxypropyl)ether of bisphenol A. The inventor prefers a polyol which has only two hydroxyl functions per molecule. Suitable candidates are available in large numbers, such as ethylene glycol, mono-ethylene glycol, ethylene glycol oligomers such as diethylene glycol, triethylene glycol, and tetraethylene glycol, 1,2-propanediol, 1,3-propanediol or oligomers thereof, such as dipropylene glycol and other polypropylene glycols, 1,2-butanediol, 2,3-butanediol, 1,4-butanediol, 1,5-pentanediol, 1,8-octanediol, 1,3-butanediol, 1,2-pentanediol, 2-methyl-2,4-pentanediol, neopentyl glycol, bisphenol A, the bis-((3-hydroxypropyl)ether of bisphenol A, and others.

Together with a divalent carboxylic acid, a divalent polyol gives a so-called "linear" polyester. This avoids excessive cross-linking, such that the viscosity of the polyester is kept quite low, so that the substance which contains the polyester is sufficiently well spreadable or sprayable, or that it flows sufficiently easily enough before the curing step, so that a good adaptation to the mold, or a good filling of the given space, may readily be achieved, with a minimum of effort.

The inventor prefers a gel coat which is primarily based on a resin made from virtually pure isophthalic acid together with neopentyl glycol.

In the manufacture of the unsaturated polyester, often unsaturated carboxylic acids are used. Suitable are ethylene-like α,β-unsaturated dicarboxylic acids, for example maleic acid, fumaric acid, citraconic acid, itaconic acid, mesaconic acid and the like, or the anhydrides thereof.

In the production of the unsaturated polyester, often also saturated carboxylic acids are used. Suitable are (ortho-) phthalic acid, or its anhydride, tetrahydrophthalic acid (or its anhydride), hexahydrophthalic acid (or its anhydride), isophthalic acid, terephthalic acid, adipic acid and succinic acid or butanoic divalent acid.

As chain terminators monohydric alcohols or acids may be used in the production of the polyester monomers which may be used as raw materials in the present disclosure. In addition, these components may be used either straight chained or branched. Also useful are polyhydric alcohols, such as glycerine, trimethylolpropane, pentaerythritol or the like, for obtaining, where possible, already some cross-linking in the monomer.

The polyesters are often offered as a solution in a liquid vinyl monomer, preferably styrene. The formulation is subsequently diluted, also called "modified" by the addition of dicyclopentadiene (DCPD). This DCPD provides additional cross-linking of the finally cured polymer, and because the reagent is a liquid, it allows to use less styrene for reaching the same low viscosity for the gel coat, in order to allow proper processing. For the gel coat, the inventor thereby prefers sometimes a "preaccelerated" version of this gel coat, wherein an amount of catalyst is added to obtain a faster curing reaction. As the catalyst, methyl ethyl ketone peroxide (MEKP) is preferably used, but other peroxides such as acetyl acetone peroxide (AAP) are suitable. Before the curing begins, this gel coat preferably has a viscosity of 2000 to 30000, preferably from 5000 to 25000, more preferably of from 8000 to 20000, and most preferably from 10000 to 18000 millipascal-second (mPa·s) or centipoise (cPs) at 20° C., measured according to NFT 51 210, with a Brookfield RVF 100 meter, using a No. 5 spindle at 20 revolutions per minute. Suitable versions are available as gel-coat HPH 6098 ST Paraf. from Ferro Plastics Europe, but also as polyester gel coat GC 875 9270 from Nord Composites.

In an embodiment of the present disclosure wherein the process comprises step a), the first curing polymer resin has a gel time of at least 10 minutes, preferably at least 11 minutes, and optionally at most 20 minutes, preferably at most 18 minutes, more preferably at most 16 minutes. The inventor has found that this selection of curing polymer resin causes the full curing of the gel coat to be slower, and that this improves the adhesion between the core and the gel coat layer, while it remains the desired property that the gel coat, after having been applied to the mold, becomes quickly "touch dry", as fast as within 40 minutes, and ready for accepting the filling composition into the mold.

The inventor prefers to use a gel coat obtainable from Polyprocess (FR) polyester gel coat Iso/NPG, type GCIG Serie W-VM, which has a gel time in the range of 11-16 minutes.

The cross-linking or curing reaction with unsaturated polyester resins is preferably a free radical polymerization reaction. This reaction is preferably initiated by an initiator, also called curing agent, a.k.a. hardener or catalyst. As initiator for the curing reaction, preferably peroxides are used, often a combination of several peroxides, more preferably organic peroxides because they are less volatile, and because they may often be supplied as a liquid. Suitable are, for example, hydrogen peroxide, benzoyl peroxide, lauryl peroxide, dicumyl peroxide, p-tertiary butyl perbenzoate, acetyl acetone peroxide (AAP), methyl isobutyl ketone peroxide, and the like. The inventor prefers to use methyl ethyl ketone peroxide (MEKP). MEKP gives a reliable performance at ambient temperature and at room temperature. The MEKP is normally supplied as a 30-40 wt % solution in a suitable solvent such as, for example, dimethyl phthalate ester. In addition, preferably, a phlegmatiser is added, which is a substance which stabilizes the relatively unstable peroxide during storage and for transport and handling, until it is expected to carry out its action. As a phlegmatiser, for example, 2,2,4-trimethyl-1,3-pentanediol diisobutyrate, also known as TXIB, may be used. Also other organic compounds having little to no of the relatively less stable —$CH_2$— groups may be used. The initiator brings the advantage that the cross-linking or curing reaction may be initiated at ambient and/or room temperature. As a result, extremely high temperatures are avoided, which could otherwise lead to discolouration, and even to a loss of the chemical and mechanical properties of the product.

In an embodiment of the present disclosure wherein the process comprises step a), the gel coat layer in step a) comprises at least one initiator, preferably only one initiator, preferably an organic peroxide, more preferably methyl ethyl ketone peroxide (MEKP). The inventor has found that the initiator brings the advantage that the temperature window in which the curing of the gel coat may start becomes wider, and may be made to include room temperature. The selection of MEKP further contributes to achieving the fast partially cured, preferably "touch dry", gel coat in the mold such that the mold may relatively quickly be subjected to step b), and this while it maintains the desired property of a slower full curing of the gel coat, as explained above.

The inventor prefers to use in the gel coat layer a high concentration of gel coat, such as at least 60 wt % based on the total gel coat layer, preferably at least 70 wt %, still more preferably at least 80 wt %, preferably at least 90 wt %, more preferably at least 95 wt %, still more preferably at least 98 wt %. The inventor prefers to use no or very little fillers in the gel coat layer, because thereby a smoother outer surface of the cladding element is obtained. Preferably the inventor adds a pigment to the gel coat layer.

The inventor prefers to provide in the gel coat layer also a curing agent or initiator, as explained above. Preferably, the inventor prefers the methyl ethyl ketone peroxide as the sole curing agent. This curing agent is preferably used as a 30-40 wt % solution in 40-50 wt % dimethyl phthalate, along with a 10-20% TXIB as phlegmatiser or stabilizer. A suitable curing agent solution is, for example, available as Andonox KP-100 of the company Norac ANDOS AB, Norpol Peroxide 1 obtainable from United Initiators (DE), and Butanox M-50 obtainable from Akzo Nobel Functional Chemicals (NL). Curing agent concentrations referred to in this document are intended to be the concentrations of the curing agent solution, including the solvent and stabilizer, and any other ingredients of the solution.

The inventor prefers to apply the curing agent in a concentration of 1.0-5.0% by weight of the gel coat layer, preferably 1.2-4.0% by weight, more preferably 1.4-3.0% by weight, even more preferably 1.5-2.5% by weight, and yet more preferably 1.8-2.2 wt %, typically about 2.0 wt %, and this on the basis of the weight of the total amount of resin, including the other monomers such as the vinyl monomer and/or DCPD, in the gel coat layer.

In an embodiment of the present disclosure, the filling composition for the core in step b), and/or, if step a) is present the gel coat layer in step a) further comprises an accelerator for the curing reaction, preferably an organometallic compound, more preferably an organic cobalt salt, even more preferably cobalt octanoate.

For accelerating the curing reaction frequently an accelerator is used. Suitable are, for example, the salts of cobalt, manganese, vanadium and iron, β-diketones selected from derivatives of acetyl acetone, derivatives of aceto acetamide, and esters of aceto acetic acid, but also tertiary aromatic amines such as, for example, dimethyl aniline, dimethyl-p-toluene, diethyl aniline, phenyl diethyl aniline, phenyl-diethanol amine, and the like. These are typically used in concentrations of 0.05-1.0 parts by weight per hundred parts of resin. With metal components thus usually only the concentration of the metal is intended.

As the reaction accelerator or accelerator the inventor preferably uses cobalt, more preferably a cobalt compound, more preferably an organometallic cobalt compound. Particularly suitable is cobalt octanoate, containing cobalt at 6% by weight, which is effective in small amounts, such as from 0.10-0.30 wt %, preferably 0.15-0.20% by weight, based on the resin. The inventor has found that this accelerator is very suitable in these concentrations, together with 1.0-3.0 wt % MEKP initiator, preferably 1.5-2.5% by weight of MEKP.

The inventor prefers to use in the gel coat layer a high concentration of gel coat, such as at least 60 wt % based on the total gel coat layer, preferably at least 70 wt %, still more preferably at least 80 wt %, preferably at least 90 wt %, more preferably at least 95 wt %, still more preferably at least 98 wt %. The inventor prefers to use no or very little fillers in the gel coat layer, because thereby a smoother outer surface of the cladding element is obtained. Preferably the inventor adds a pigment to the gel coat layer.

In an embodiment of the present disclosure wherein the process comprises step a), the gel coat layer contains a suitable amount of titanium dioxide as pigment. The titanium dioxide acts as a pigment, but also performs as a filler. In addition, the titanium dioxide brings an antibacterial function, presumably but not necessarily one of bacterial repulsion, a function which is highly appreciated in sensitive applications, a.o. in the food industry.

In the composition for the filling of the core in step b), inventor prefers to use a significant amount of filler material. This provides important mechanical properties to the core, and is also more readily available than the binder, so that the products of the process according to the present disclosure may be provided for many applications, and may offer therein an economically valuable alternative when compared to other products which are produced on a different base.

As filling material a wide range of possible candidates may be designated as being suitable. In principle all solids on which the binder is prepared to adhere could be used as granulate, including recycled plastics.

The inventor however prefers to use at least partially mineral filler material, most preferably only mineral filling material, mainly because this is chemically less active, usually even inert, and hence there is no influence on the cross-linking of the filler material and/or curing reaction. In addition, mineral fillers usually have a lower porosity than for example plastics, whereby they take up less of the binding agent and the amount of resin does not have to be increased to compensate for such absorption. An additional advantage is the generally common availability of suitable mineral fillers.

In an embodiment of the present disclosure, the mineral filler in step b) is selected from the list consisting of quartz, preferably quartz grains, more preferably quartz grains having an average particle size in the range of 1 to 3 mm, more preferably dried quartz grains, sand, preferably sand which has been dried and sieved, dolomite powder, and mixtures or combinations thereof.

The inventor prefers a mineral filler of which the particles have been obtained by breaking, rather than round aggregates. The inventor has found that this provides for a better binding of the curing resin to the filler at the corners of the product.

The inventor has found that a combination of a first filler, which comprises larger grains, with a second filler having a finer grain size, gives a very good degree of filling, and yet allows to limit the amount of polymer resin which is required as the binder. The inventor prefers that the smaller grains are selected such that they fit into the spaces of a stacking of the larger grains, so that they at least partly fill the spaces between the large grains with filler material, and that there is therefore less binder material is required. Therefore, the inventor prefers to use a mixture of a first filler with grains which have an average diameter in the range of 0.5-5 mm, preferably at least 1.0 mm, and also preferably not more than 4 mm, more preferably not more than 3 mm, with a second filler with fine grains having an average diameter in the range of 50-500 µm, preferably 100-400 µm, more preferably 150-350 µm, more preferably 200-300 µm and at still more preferably 235-280 µm.

The inventor prefers to use a mixture comprising 56 parts by weight of quartz grains having an average particle diameter in the range of 1 to 3 mm, and 32 parts by weight of quartz sand with a mean particle diameter (D50) of about 260 µm.

As first filler, many suitable candidates are available. The inventor prefers to use EIFEL quartz, 1-3 mm, available from EUROTREX or EIFEL QUARTZ ⅓ from E.VICTOR-MEYER (BE). As second filler a whole range of suitable candidates are also available. The inventor prefers to use M32 quartz sand, available from SIBELCO Benelux (BE).

The inventor has found that the filling properties of the filler material may be further improved by the addition of a third filler with an even smaller grain size, which is suitable for also filling the smaller spaces between the grains of the second filler. The inventor prefers the third filler having an average grain diameter (D50) in the range of 5-200 µm, preferably 10-100 µm, more preferably 20-70 µm and even more preferably 30-50 µm. Many suitable filler powders are available. The inventor prefers therefore to use dolomite, which consists for about 99 wt % of calcium magnesium carbonate $CaMg(CO_3)_2$, such as dolomite powder Microdol A 70 available from OMYA Benelux. This powder also has the advantage that it also serves as a pigment, and makes the colour of the composition lighter, which is favourable in order to have no effect on the colour which the gel coat layer brings.

The inventor prefers to use a mixture of about 56 parts of the dried silica 1-3 (for example 1-3 EIFEL quartz) with about 33 parts of treated sand (for example, M32 SIBELCO quartz sand) in which further approximately 11 parts of dolomite powder (for example Microdol A70 of OMYA or Madol 100 of E.VICTOR-MEYER) is incorporated.

In an embodiment of the present disclosure using a mineral filler comprising dolomite powder, the dolomite powder has a pH of at most 9.5, preferably at most 9.0, more preferably at most 8.5, even more preferably at most 8.0, preferably at most 7.5, more preferably at most 7.0, more preferably at most 6.5, and optionally at least 5.5, preferably at least 6.0. The inventor has found that bringing the pH of the dolomite powder in compliance with the prescribed limits brings the advantage that the dolomite powder absorbs less resin, such that more resin remains available as a binder for the composition. The inventor has found that this feature on the dolomite powder allowed to reduce the amount of binder in the composition for obtaining the same final product properties. The inventor has found that this feature allowed to reduce the binder concentration in the filling composition significantly. The inventor prefers to use dolomite powder Madol 100 obtainable from E.VICTOR-MEYER (BE), which has a pH of 6.38.

In an embodiment of the present disclosure, the mold before step b), or if the process comprises step a) before the application of the gel coat layer in step a), is treated with a release agent.

In order to more easily remove the product from the mold, after the optional curing of the gel coat layer and of the curing of the composition in the core, the inventor prefers that the mold be rubbed in with an external release agent or a release wax (also called "mold release agent" or "mold release wax"). In one embodiment of the method according to the present disclosure, the mold is, before step b) or before the application of the gel coat layer in step a), rubbed in with a release agent (mold release agent, release wax). This release wax is preferably polished into the mold, as this gives a smoother outer surface of the produced article, which increases the aesthetic appearance, but also the hygienic aspect of the object.

Many substances and compositions are suitable as a release agent. The inventor prefers to use silicone-free formulations, to avoid unwanted colour effects on the cured gel coat layer. Better are versions with little or no own colour, preferably transparent, and having a colour of not more than 6 Gardner (ASTM D 1544-80), and more preferably not more than 4 Gardner, because they do not materially affect the colour of the product. The inventor prefers to use a hydrocarbon mixture, or a derivative thereof. Very suitable are, for example, hydrogenated petroleum distillates, preferably the heavier fractions having a boiling point of at least 140° C., and preferably also having a flash point (closed cup) of at least 24° C. These heavier fractions impose lesser requirements relating to industrial hygiene and safety. However, the inventor prefers to use at least partially fractions which are not too heavy, preferably the "middle distillate" fractions, also known as kerosene or diesel oil types. Heavier fractions, such as waxes, may then be dissolved therein. Even more suitable are those fractions which are also desulphurized down to a low content of sulphur, such as at most 50 ppm by weight, preferably at most 30 ppm by weight, and even more preferably at most 10 ppm by weight. Thereby they also offer a better chemical resistance, and higher resistance to discolouration, usually yellowing, and they are also suitable for food contact. Suitable products are for instance Ce-Sense Slip-X10 available from Brands Structural Products (NL).

The release agent may be applied by hand or by spraying. Preferably, the release agent is first left to dry before it is polished to a high gloss. On new or cleaned molds, the material is preferably thinly applied 2-3 times to obtain a good coverage and a uniform thickness.

The inventor prefers that this external release agent is applied in a very homogeneous thin layer with a very smooth top surface. This ensures that the top surfaces of the product of the method which were in contact with a wall of the mold, obtain a very smooth aspect, and even become glossy.

In addition, also an internal release agent may be used. Many materials are suitable for this. The inventor prefers ADDITIV MIKON® INT-250 from MÜNCH-CHEMIE, to be used as an additional ingredient in the gel coat layer.

In an embodiment of the present disclosure, the release agent comprises a polymeric resin, preferably dissolved in an aliphatic hydrocarbon solvent. The inventor prefers to use as the release agent the product obtainable from the company Marbocote Ltd (UK) under the brandname and type SPRAYCOTE FD. The inventor has found that this type of release agent provides several advantages. This type of release agent is semi-permanent, in that the mold to which this type of release agent has been applied may be reused more than three times before another layer of release agent needs to be applied. The inventor has further found that the mold does not need cleaning before this next layer of release agent may be applied, a cleaning that was necessary with other types of release agents in order to remove contamination which lead to dull and/or rough surfaces and product rejection. These advantages bring significant reductions in the amount of human intervention that the process according to the present disclosure requires. The inventor has further found that this type of release agent brings a better gloss and surface smoothness of the final product, elements which highly contribute to better aesthetics and a higher quality impression.

In an embodiment of the present disclosure wherein the process comprises step a), the gel coat layer is applied by means of a technique selected from the list of spreading, for example with a brush and/or roller, spraying, and combinations thereof, preferably by spraying with a spray gun under pressure.

In an embodiment of the present disclosure, to the polymer resin of the core and/or of the gel coat layer, a.k.a. as the top layer, at least 0.5% and at most 20% by weight is added, expressed on the basis of the total amount of polymer resin in the top layer or in the core, of an additional unsaturated polyester resin which is characterized by an elongation at break after curing of the resin and tested according to ISO 527 of at least 4.0%.

Preferably, the elongation at break of this additional unsaturated polyester resin, after curing of the resin and tested according to ISO 527, is at least 5.0%, more preferably at least 10%, even more preferably at least 20%, preferably at least 30%, more preferably at least 40%, and still more preferably at least 45%. If necessary, this resin may be chosen so that the elongation at break is not more than 100%, preferably not higher than 75%, and more preferably not higher than 60%. In this way, the risk is reduced that the hardness would be reduced.

The resin is usually obtained by making the polyester chain somewhat longer, preferably by incorporation of longer polyol monomers, preferably polyol monomers of which the chains are not strictly linear, but exhibit angles. Thus, one may, for example, instead of using only mono-ethylene glycol, also use oligomers thereof, preferably those which contain one or more ether functions as part of the chain. Thus, one may for example use triethylene glycol or tetraethylene glycol in the production of these polyesters. Also, one may start from a mixture of polybasic carboxylic acids, or produce polyesters with longer chain lengths, in order to obtain a polyester which will form less crystalline and more amorphous regions, so that the cured resin exhibits a certain degree of elasticity.

The inventor preferably uses for the core not more than 15% by weight of this additional polyester resin, and this primarily because the hardness of the final product should not decrease too much. More preferably, the inventor uses a maximum of 10% by weight, even more preferably at most 5% by weight, and even more preferably at most 3% by weight of this additional resin, and this relative to the total amount of resin which is used in the filling composition of the core.

In the gel coat layer, the inventor preferably uses not more than 16% by weight of this additional polyester resin. More preferably, the inventor uses a maximum of 12% by weight, even more preferably at most 9% by weight, and yet more preferably at most 7% by weight of this additional resin, and this relative to the total amount of resin which is used in the filling composition of the gel coat layer. The inventor preferably uses in the gel coat layer at least 2% by weight, more preferably at least 3% by weight and even more preferably at least 4% by weight, expressed on the same basis. This quantity has been found to be sufficient for giving the desired properties to the gel coat top layer. As discussed later, this additional resin may also be used as pre-mixed.

The inventor has found that this additive gives a higher elasticity to the cured gel coat layer and/or to the cured core. This offers several advantages. The addition to the core offers the advantage that residual stresses are reduced which may arise from differences in shrinkage in the core itself, due to possible local differences in composition, but also between the core and the gel coat layer. The stresses may be reduced, and less likely lead to cracks, so that there are much less end-products which have to be rejected or further treated to remain useful.

This addition of the additional polyester resin also has the advantage that, when installing the cladding element, which, depending on its size, may have a considerable weight, and, therefore, often has to be placed with the help of mechanical tools such as a crowbar, there is less risk for flaking off of the gel coat layer, so that the aesthetic effect is better preserved, and fewer elements turn useless during the installation and must be replaced and/or discarded.

In an embodiment of the present disclosure, the filling composition further contains a substance which is selected from a dye, a pigment, paint flakes, metal flakes, and combinations thereof. For example, the filling composition may be pigmented with a wide choice of pigments, in every available colour, for example, with each of the available RAL colors. The inventor has found that the article as produced by the process according to the present disclosure without step a), may be given a more aesthetic appeal, which makes the article more acceptable for many applications. The inventor prefers to use a pigment, preferably a white pigment, in a concentration of at least 0.05% wt and at most 2.0% wt relative to the total weight of the filling composition, preferably at least 0.1% wt, more preferably at least 0.2% wt, even more preferably at least 0.3% wt and optionally at most 1.5% wt, preferably at most 1.0% wt, more preferably at most 0.6% wt, even more preferably at most 0.5% wt on the same basis. The inventor has found that the addition of this pigment also reduces the viscosity of the filling composition, such that it is easier to process and more readily provides for smooth surfaces of the article produced.

In an embodiment of the present disclosure wherein the process comprises step a), the gel coat layer further contains a substance which is selected from a dye, a pigment, a filler, paint flakes, metal flakes, and combinations thereof. For example, the gel coat layer may be pigmented with a wide choice of pigments, in every available colour, for example, with each of the available RAL colours. Without the addition of a dye optionally also a transparent version is possible.

In an embodiment of the present disclosure wherein the process comprises step a), the partial curing of the gel coat layer comprises the retention of the coated mold in an environment with a temperature in the range of from 10° C. to 50° C., preferably at least 15° C. and more preferably at least 18° C., and optionally not more than 35° C., preferably at most 30° C., even more preferably at most 25° C., and still more preferably at most 23° C. The storage preferably occurs for a period of time of at least 2 minutes, preferably at least 5 minutes, even more preferably at least 10 minutes, and yet more preferably at least 15 minutes. Optionally, the retention takes no longer than 24 hours, preferably no longer than 18 hours, more preferably no longer than 12 hours, and even more preferably at most 6 hours.

In an embodiment of the present disclosure, the filling composition for step b) is obtained by first dry blending of the mineral filler material, if present with other dry ingredients of the filling composition, followed by the injection of the curing polymer resin, preferably as a mixture which possibly shortly before the injection was mixed with the initiator and/or with at least one and preferably all of the other liquid ingredients of the filling composition, and subsequently mixing of the liquid and the solid ingredients of the filling composition, preferably by means of a worm wheel or an Archimedes screw which brings the filling composition while mixing at or above the coated mold. The inventor has found that this step is very easy to carry out and may readily be automated. The inventor has found that suitable machines are offered to execute this step. The inventor prefers to use a mixing machine which is derived from the type Perfecta, available from the company ADM Monobloc (DE).

In an embodiment of the present disclosure, as part of step b), after the insertion of the filling composition in the core of the coated mold, the mold is being vibrated, possibly in more than one cycle, each time with an interval, between which the mold may be transferred to a different location, and wherein preferably the vibration occurs at a frequency of a number of cycles per minute which is in the range of 10 to 600 cycles per minute, and this for a total vibration time which is in the range of 15 seconds to 2 minutes. This additional feature provides for a good filling of the core volumes, by a thorough deaeration of the filling composition under curing. It also improves the adhesion between the two components of the product, namely the gel coat layer and the composition which fills the core of the coated mold.

In an embodiment of the present disclosure, as part of step b), upon introduction of the filling composition into the core of the coated mold the amount of introduced filling composition is accurately proportioned and limited in such a way that, if present after shaking, it fills at least 100% of the remaining free volume of the mold and not exceeding 105% of that remaining free volume.

EXAMPLE

A stainless steel mold for a plinth is polished with a layer of Marbocote® Spraycote FD obtained from the company Marbocote Ltd (UK) and applied by brush. With a soft cloth, this release is wax very thoroughly spread into all irregularities and corners of the mold, and the wax is additionally polished until the wax layer provides a very smooth inner surface. Into the polished mold is subsequently applied a gel coat layer, by means of a spray gun. The gel coat layer contains 98 wt % polyester gel coat Iso/NPG GCIG Serie W-VM obtained from Polyprocess (FR), which already contained titanium dioxide, in which was further added 2.0 wt % Norpol Peroxide 1 obtained from United Initiators (DE).

The coated mold is stored during 20 minutes in an environment with a temperature of 20° C. to partially cure the gel coat layer. Subsequently, the core of the mold is filled with a filling composition.

The following solid materials are mixed in the indicated quantities by weight:
- 56 parts of quartz grains EIFEL QUARTZ ⅓ from E.VICTOR-MEYER (BE),
- 32 parts quartz sand M32 from SIBELCO Benelux (BE), and
- 12 parts dolomite powder Madol 100 from E. VICTOR-MEYER (BE), which has a pH of 6.38.

The EIFEL QUARTZ ⅓ were quartz sand-size aggregates having particles in the size range of 1 to 3 mm. The SIBELCO M32 was quartz sand having a d50 of about 260 μm. The Madol 100 was a pure white dolomite having a d50 of about 10 μm.

In order to prepare the filling composition for the core, this solid mixture was blended in a ratio of 89/11 with a polyester resin binder, consisting of 96 wt % Poliplast R 96.02 obtained from Carlo Ricco' & F.lli S.p.A. (IT), wherein as hardener 2.0 wt % Butanox M-50 obtained from Akzo Nobel Functional Chemicals (NL), which comprises MEKP as the sole curing agent, and as accelerator 2.0 wt % Accelerator NL-49P obtained from Akzo Nobel Polymer Chemicals BV (NL) were added.

The core of the coated mold was filled with a slight excess of the filling composition, and immediately vibrated to promote a good filling and to obtain a good deaeration of also the core of the product. The filled mold was allowed to further react by storage at about 18° C. during a period of at most 40 minutes hours.

The product was subsequently removed from the mold, which was easily possible thanks to the small shrinkage inherent with the use of the polyester binder. The product exhibited very smooth surfaces where the product had been in contact with a wall of the mold.

The used mold was clean and still contained sufficient release agent so that it immediately a new gel coat layer could be sprayed in and the production of a new plinth in the same mold could be started from that point onwards on.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A process for the production of an article for the cladding of floors or walls, comprising the steps of in a mold:
   a) optionally applying a gel coat layer, based on a first curing polymer resin, on the inside of the mold in order to obtain a coated mold,
   b) introducing into the core of the mold or into the core of the coated mold from step a) a filling composition which is based on a second curing polymer resin supplemented with at least one mineral filler,
   wherein the core of the article has a thickness of at least 20 mm, the filling composition for the core contains at least 10% wt and at most 20% wt of curing polymer resin, relative to the dry amount of the filling composition, and the filling composition contains methyl ethyl ketone peroxide as the only one single initiator in a concentration of 0.5% wt to 5.0% wt relative to the amount of curing polymer resin in the filling composition,
   whereby the curing reaction of the filling composition is initiated at ambient temperature.

2. The process according to claim 1, wherein the core of the article has a thickness of at least 25 mm.

3. The process according to claim 1, wherein the core is fiber-reinforced.

4. The process according to claim 1, wherein the core contains at most 19% wt of curing polymer resin.

5. The process according to claim 1, wherein the second curing polymer belongs to the family of unsaturated polyester polymer resins, and wherein for the curing reaction a vinyl monomer has been incorporated.

6. The process according to claim 5 for reducing the concentration of the vinyl monomer that is remaining in the article.

7. The process according to claim 5 for a purpose selected from improving the industrial hygiene for the people installing the article and improving the fire performances of the article.

8. The process according to claim 1, comprising step a) wherein the first and the second curing polymer resins belong to the same chemical family of curable polymeric resins.

9. The process according to claim 1, comprising step a) wherein the gel coat layer in the coated mold of step a) is only cured partially before the coated mold of step a) is subjected to step b).

10. The process according to claim 9, wherein the curing polymer resin of step a) is cured only until the gel coat layer is at most touch dry, before the coated mold of step a) is subjected to step b).

11. The process according to claim 1, comprising step a) wherein the first curing polymer resin belongs to the family of unsaturated polyester polymer resins, and wherein for the curing reaction a vinyl monomer has been incorporated.

12. The process according to claim 11, wherein the first curing polymer resin has a gel time of at least 10 minutes.

13. The process according to claim 1, comprising step a) wherein the gel coat layer in step a) comprises at least one initiator.

14. The process according to claim 1, wherein the filling composition for the core in step b), and/or, if step a) is present the gel coat layer in step a), further comprises an accelerator for the curing reaction.

15. The process according to claim 1, wherein the mineral filler in step b) is selected from the group consisting of quartz, sand, dolomite powder, and mixtures or combinations thereof.

16. The process according to claim 15, wherein the dolomite powder has a pH of at most 9.5.

17. The process according to claim 1, wherein the mineral filler in step b) comprises a mixture of a first filler with grains which have an average diameter in the range of 0.5-5 mm, with a second filler with fine grains having an average diameter in the range of 50-500 μm.

18. The process according to claim 1, wherein the mold before step b), or before step a) if the process comprises step a), is treated with a release agent.

19. The process according to claim 18, wherein the release agent comprises a polymeric resin, dissolved in an aliphatic hydrocarbon solvent.

20. The process according to claim 1, comprising step a) wherein the gel coat layer is applied by a technique selected from the group consisting of spreading, spraying, and combinations thereof.

21. The process according to claim 1, wherein to the polymer resin of the core and/or of the gel coat layer at least 0.5% and at most 20% by weight is added, expressed on the basis of the total amount of polymer resin in the gel coat layer or in the core, of an additional unsaturated polyester resin which is characterized by an elongation at break after curing of the resin and tested according to ISO 527 of at least 4.0%.

22. The process according to claim 1, wherein the filling composition further contains a substance which is selected from a group consisting of a dye, a pigment, paint flakes, metal flakes, and combinations thereof.

23. The process according to claim 1, comprising step a) wherein the gel coat layer further contains a substance which is selected from a group consisting of a dye, a pigment, a filler, paint flakes, metal flakes, and combinations thereof.

24. The process according to claim 1, comprising step a) wherein the partial curing of the gel coat layer comprises the storage of the coated mold in an environment with a temperature in the range of from 10° C. to 50° C.

25. The process according to claim 1, wherein the filling composition for step b) is obtained by first dry blending of the mineral filler material, if present with other dry ingredients of the filling composition, followed by the injection of the curing polymer resin, preferably as a mixture which possibly shortly before the injection was mixed with the initiator and/or with at least one and all of the other liquid ingredients of the filling composition, and subsequently mixing of the liquid and the solid ingredients of the filling composition, by a worm wheel or an Archimedes screw which brings the filling composition while mixing at or above the coated mold.

26. The process according to claim 1, wherein as part of step b) after the introduction of the filling composition into the core of the coated mold the mold is vibrated, possibly in more than one period, with each time an interval, between which the mold may be transferred to another location, and wherein the vibration occurs at a frequency of a number of cycles per minute which is in the range of 10 to 600 cycles per minute, and for a total vibration time which is in the range of 15 seconds to 2 minutes.

27. The process according to claim 1, wherein as part of step b), upon introduction of the filling composition into the core of the coated mold the amount of introduced filling composition is limited in such a way that, if present after shaking, it fills at least 100% of the remaining free volume of the mold and not exceeding 105% of that remaining free volume.

* * * * *